(No Model.)
R. HOFFMAN.
BELTING.
No. 547,788. Patented Oct. 15, 1895.
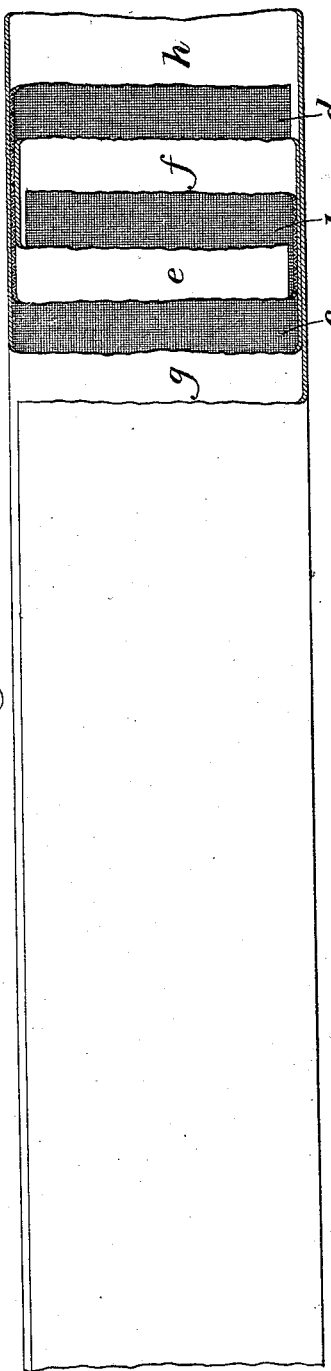
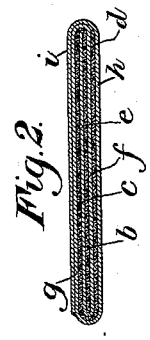
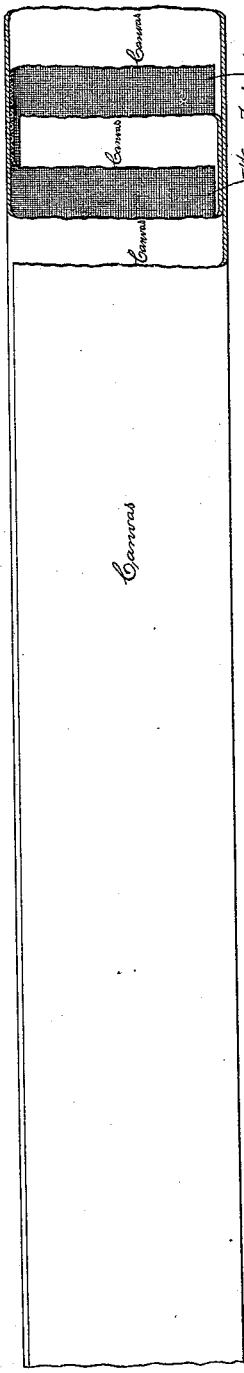
Fig.1. Fig.2. Fig.3. Fig.4.
WITNESSES
Warren W. Swartz
INVENTOR
Robert Hoffman
by his Attorneys
W. Bakewell & Sons

UNITED STATES PATENT OFFICE.

ROBERT HOFFMAN, OF PITTSBURG, PENNSYLVANIA.

BELTING.

SPECIFICATION forming part of Letters Patent No. 547,788, dated October 15, 1895.

Application filed August 25, 1894. Serial No. 521,305. (No model.)

*To all whom it may concern:*

Be it known that I, ROBERT HOFFMAN, of Pittsburg, in the county of Allegheny and State of Pennsylvania, have invented a new and useful Improvement in Belting, of which the following is a full, clear, and exact description.

My invention consists in a composite belting composed of alternate layers of wire fabric and canvas or other textile fabric, the wire fabric being folded lengthwise into two or more plies, the canvas being folded between and around the same, and the wire and canvas being adhesively secured together, preferably, by a rubber cement, which is finally vulcanized.

In Figures 1 and 2 of the drawings I show my improved belting when composed of three or more plies of wire fabric, and Figs. 3 and 4 are modifications of the same. This fabric is a single sheet folded lengthwise twice upon itself, so as to afford three plies $b\ c\ d$. The canvas (also a single sheet) is folded in and with the wire fabric, one ply $e$ of the canvas being between the plies $b\ c$, the second ply $f$ being between the plies $b\ d$, the third ply $g$ of canvas being outside the ply $c$, the fourth ply $h$ being outside the ply $d$, and the fifth ply $i$ being outside and in contact with the ply $g$. The canvas is coated on both sides with rubber cement before it is folded in with the wire fabric, and when folded the whole is subjected to compression, so as to force the cement through the interstices of the wire fabric and to bond the whole belting into one united compact body. The whole is then vulcanized by subjecting the belting to heat, and the belting is then ready to be used. It will be noticed that on one side of the belting so made there are two adjacent plies of canvas $g$ and $i$, and this side is in use placed next to the pulleys around which the belt passes, in order that the strain on the belt required to impart motive power shall more truly bind together the whole construction of the belting. The edges of the wire fabric are by the interfolded canvas covered with and protected by seamless parts of the canvas, and because of this peculiar construction the belting is very durable and strong and does not stretch or tear when in use.

I am aware that belts composed of a strip of wire fabric and a canvas covering have been described; but I believe to be new the belt constituted of interfolded plies of wire and canvas, such as I show.

In Fig. 3 I illustrate my improved belting when composed of only two plies of wire fabric and four plies of canvas, the principle according to which these are folded together being the same as described above.

My broader claim is not limited to any particular number of plies on the pulley side.

I claim—

1. Belting composed of longitudinally folded canvas or similar fabric and similarly folded wire fabric, the plies of the one material being interfolded with those of the other and secured thereto by vulcanized cement; substantially as described.

2. Belting composed of longitudinally interfolded plies of wire fabric and canvas adhesively secured together by vulcanized cement, two plies of canvas being adjacent on the pulley-side of the belting; substantially as described.

In testimony whereof I have hereunto set my hand.

ROBERT HOFFMAN.

Witnesses:
H. M. CORWIN,
F. E. GAITHER.